Jan. 16, 1951  S. HOAR ET AL  2,538,000
TRACTOR-PROPELLED IMPLEMENT
Filed March 13, 1946  6 Sheets-Sheet 1
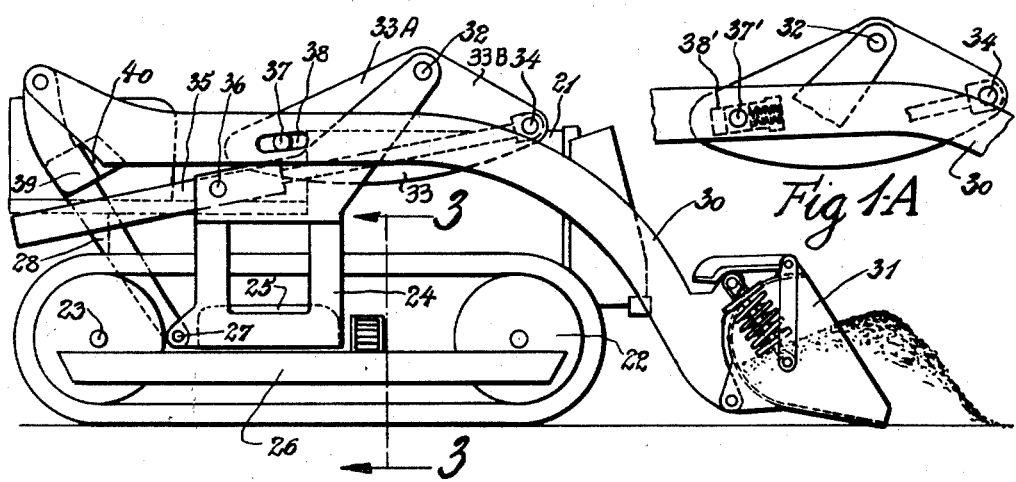
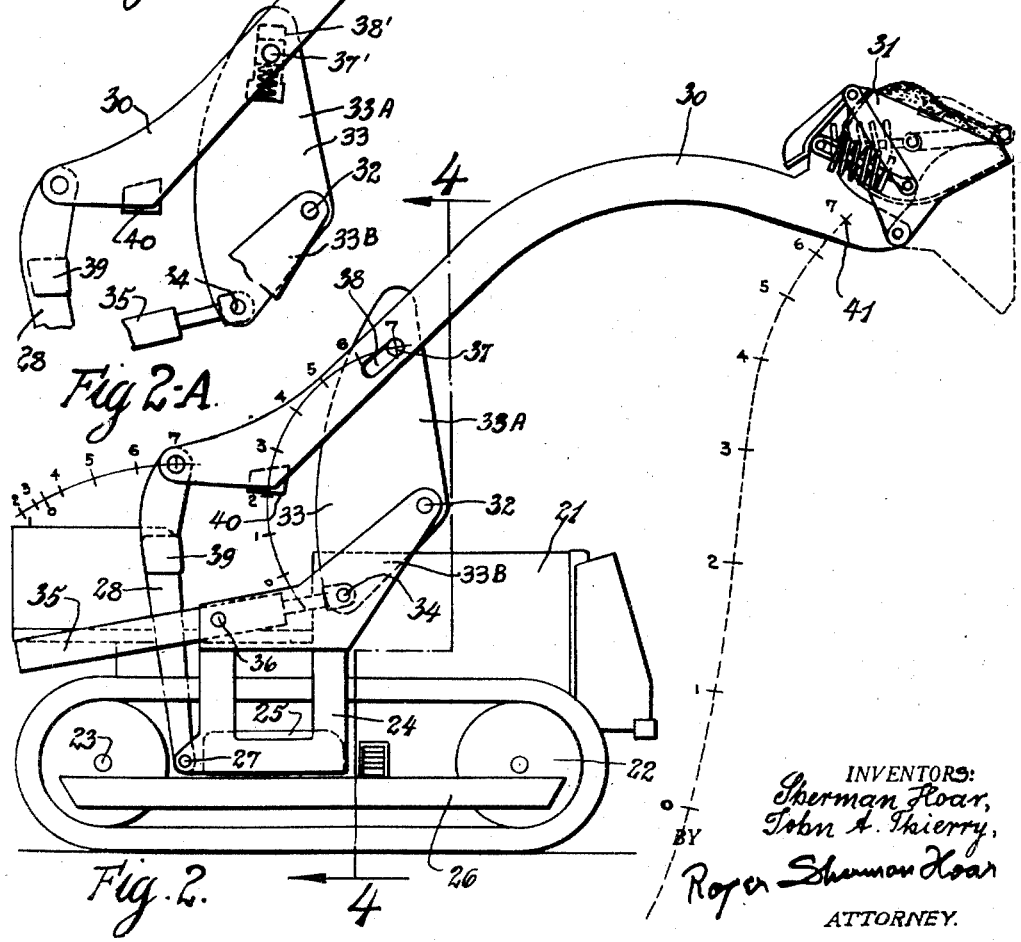
INVENTORS:
Sherman Hoar,
John A. Thierry,
BY Roger Sherman Hoar
ATTORNEY.

Jan. 16, 1951　　　　　　S. HOAR ET AL　　　　　　2,538,000
TRACTOR-PROPELLED IMPLEMENT

Filed March 13, 1946　　　　　　　　　　　　6 Sheets-Sheet 2

INVENTORS:
Sherman Hoar,
John A. Thierry,
BY Roger Sherman Hoar
ATTORNEY.

Jan. 16, 1951  S. HOAR ET AL  2,538,000
TRACTOR-PROPELLED IMPLEMENT
Filed March 13, 1946  6 Sheets-Sheet 3

INVENTORS:
Sherman Hoar,
John A. Thierry,
BY Roger Sherman Hoar
ATTORNEY.

Jan. 16, 1951 S. HOAR ET AL 2,538,000
TRACTOR-PROPELLED IMPLEMENT
Filed March 13, 1946 6 Sheets-Sheet 5

INVENTORS,
Sherman Hoar,
John A. Thierry,
BY
Roger Sherman Hoar
ATTORNEY.

Jan. 16, 1951 S. HOAR ET AL 2,538,000
TRACTOR-PROPELLED IMPLEMENT
Filed March 13, 1946 6 Sheets-Sheet 6

INVENTORS.
Sherman Hoar,
John A. Thierry,
BY
Roger Sherman Hoar
ATTORNEY.

Patented Jan. 16, 1951

2,538,000

UNITED STATES PATENT OFFICE 2,538,000

TRACTOR-PROPELLED IMPLEMENT

Sherman Hoar, Concord, Mass., and John A. Thierry, South Milwaukee, Wis.; said Thierry assignor to Bucyrus-Erie Company, South Milwaukee, Wis., a corporation of Delaware Application March 13, 1946, Serial No. 654,112

20 Claims. (Cl. 214—139)

Our invention relates to new and useful improvements in tractor-propelled and operated implements, and more particularly push-scoops for tractors.

Implements of that type are adapted to be attached to conventional tractors, either wheeled or creeping-traction, preferably the latter. The implement proper is usually mounted on the ends of two arms, which straddle the tractor laterally, are supported by the main tractor frame and/or the traction units, and extend in front of or behind the tractor. Power means are provided for raising and lowering the implement proper, it being forced into the bank, for digging, by the forward motion of the tractor. As more specifically shown and described herein, the implement and tractor constitute together a tractor-shovel.

The problem of designing such a tractor-shovel is complicated by the fact that all past methods of supporting the rear ends of the arms, and of guiding the front ends of the arms, possess some advantages and many disadvantages.

Accordingly the principal object of our invention is to devise a tractor-shovel which will have many of the advantages and few of the disadvantages of each of these methods of mounting.

A further object is to devise a tractor-shovel in which all the digging reactions, and load-lifting reactions, are transmitted to the ground through the traction units, without passing through the main frame.

A further object is to devise a tractor-shovel in which the digging reactions are applied so low as to have practically no tendency to tip the tractor over backwards.

A further object is to provide a tractor-shovel in which the dipper will project further in front of the tractor when the dipper is raised in dumping position than when it is in digging position.

A further object is to devise a tractor-shovel having low overhead clearance, no obstructions to the vision of the operator, and a low center of gravity to prevent overturning sideways when in dumping position.

A further object is to devise a tractor-shovel of compact and attractive appearance.

A further object is to provide a tractor-shovel in which rollers and tracks to guide the push arms into raised position for dumping are eliminated.

A further object is to devise a tractor-shovel in which relative oscillation of the two traction units, in going over uneven ground, will be equalized.

A further object is to devise a tractor-shovel in which thrusting the dipper into the bank can be accomplished other than by moving the tractor itself forward.

A further object is to provide a shovel mechanism readily mountable on, and demountable from, a tractor.

A further object is to provide a tractor-shovel mechanism that is adaptable for manufacture of a simple model or toy simulating a tractor-shovel and using a minimum number of parts.

In addition to our principal objects, above stated, we have worked out a number of novel and useful details, which will be readily evident as the description progresses.

Our invention consists in the novel parts and in the combination and arrangement thereof, which are defined in the appended claims, and of which three embodiments are exemplified in the accompanying drawings, which are hereinafter particularly described and explained.

Throughout the description, the same reference number is applied to the same member or to similar members.

Figure 1 is a side elevation of one embodiment of our device, in digging position.

Figure 2 is a side elevation of the same embodiment, in dumping position, with lines to indicate the respective paths of three principal points of our device from position to position.

Figure 3:
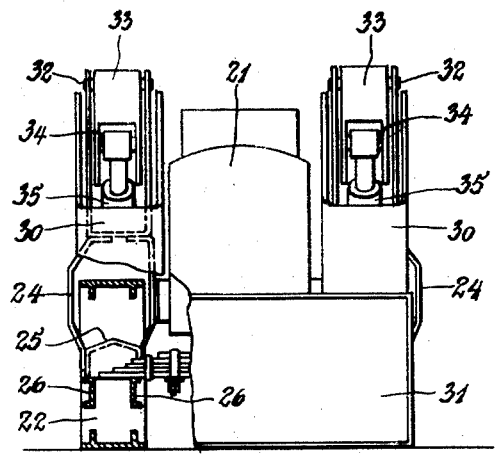
Figure 4:
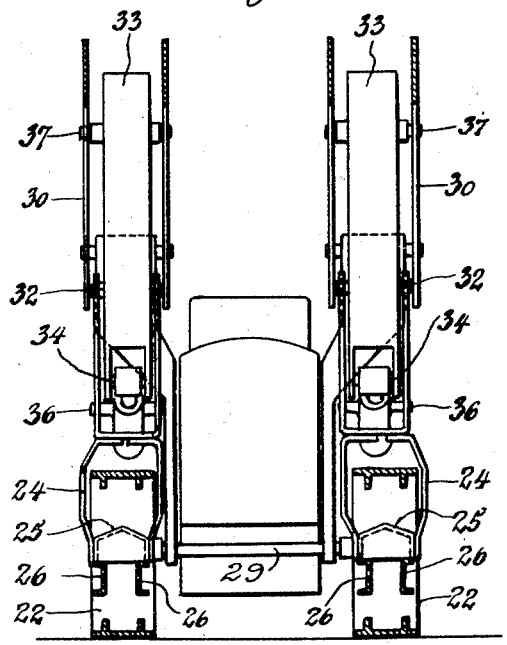

Figures 3 and 4 are front elevations of the same embodiment, in digging and dumping positions respectively, partly in section, taken along the lines 3—3 of Figure 1, and 4—4 of Figure 2.

Figure 1A is a side elevation of a sub-variant of one part of the same embodiment, in digging position.

Figure 2A is a side elevation of the sub-variant of Figure 1A, in dumping position.

Figure 5:
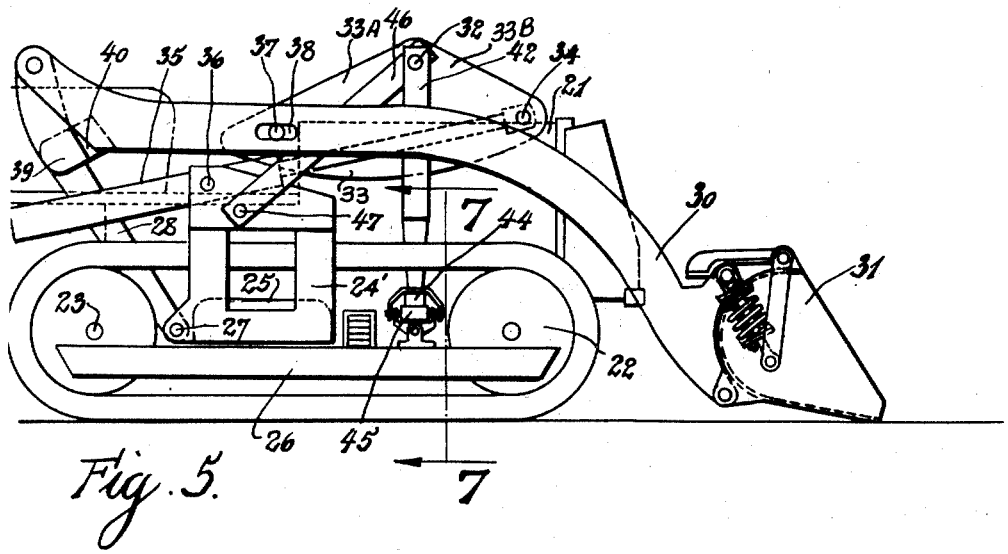

Figure 5 is a side elevation of the second embodiment of our device, in digging position.

Figure 6:
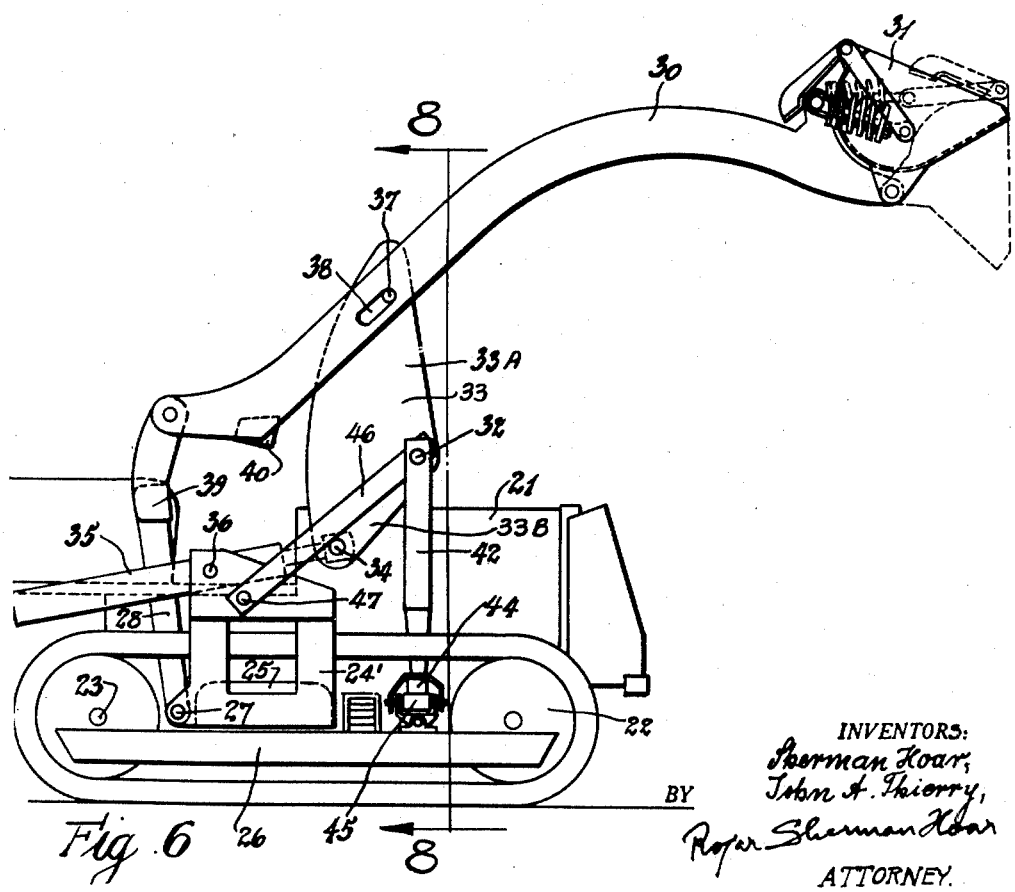

Figure 6 is a side elevation of the same embodiment, in dumping position.

Figure 7:
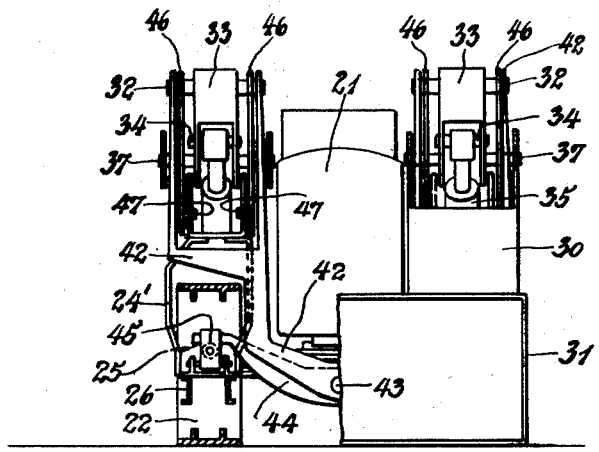
Figure 8:
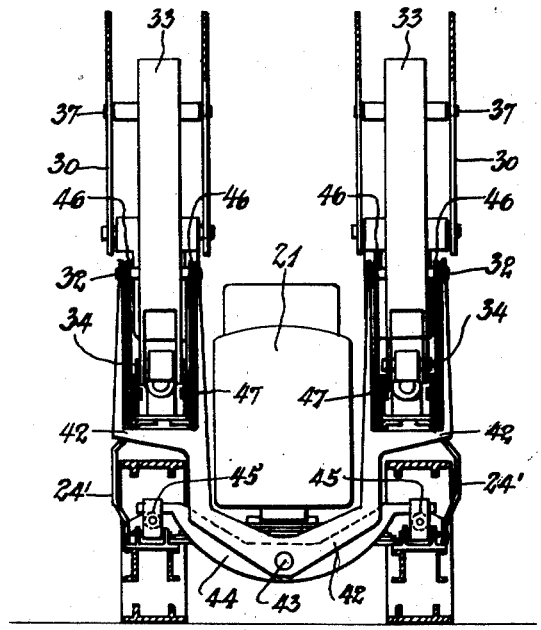

Figures 7 and 8 are front elevations of the same embodiment, in digging and dumping positions respectively, partly in section, taken along the line 7—7 of Figure 5, and 8—8 of Figure 6.

Figure 9:
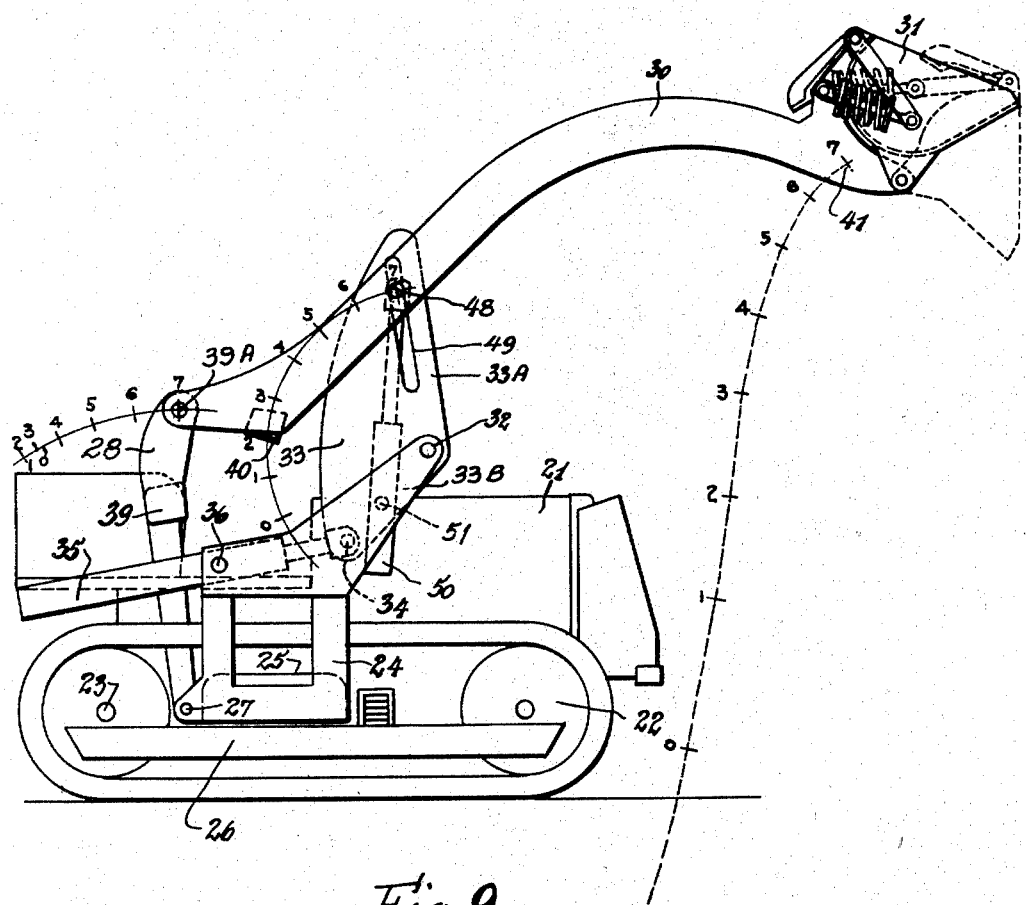

Figure 9 is a side elevation of the third embodiment of our device, in dumping position, with lines to indicate the respective paths of three principal points of our device from position to position.

Figure 10:
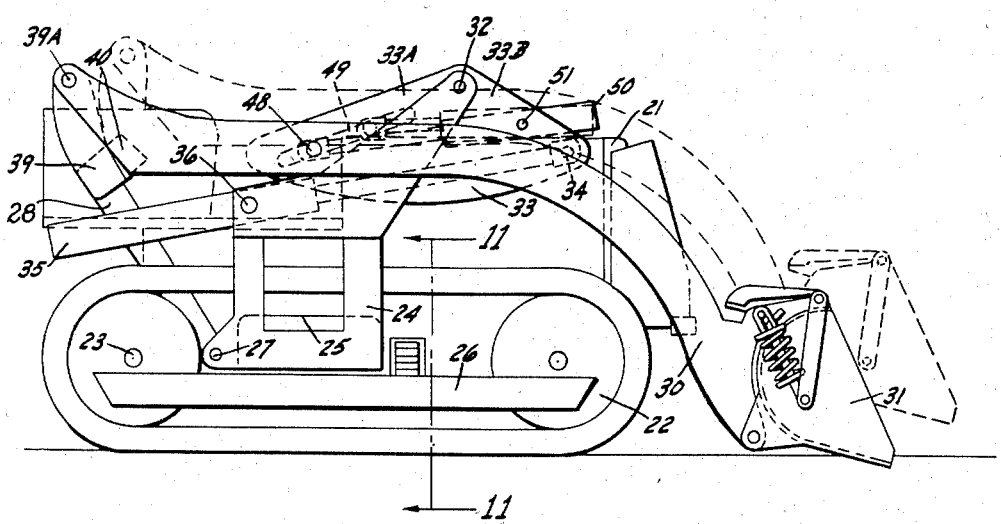

Figure 10 is a side elevation of the third embodiment of our device, in digging position, with broken lines showing the dipper and push arms in crowd out position.

Figure 11:
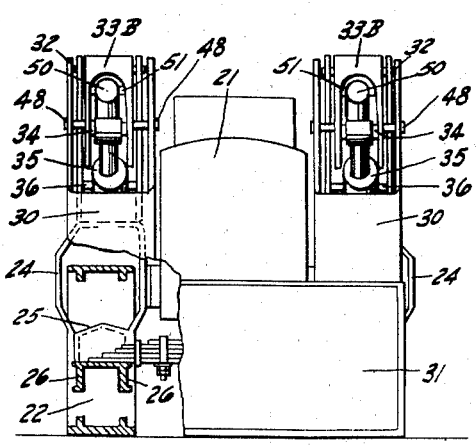

Figure 11 is a front elevation, partly in section taken along the line 11—11 of Figure 10, of the third embodiment in digging position.

Referring now to Figures 1, 2, 3 and 4 for a showing of our first embodiment, we see that 21 is the main frame of a conventional tractor, supported by two creeping traction units 22, independently oscillable about rear axle 23. The details of the tractor form no part of our invention, and are immaterial except so far as hereinafter discussed.

For convenience in assembling and disassembling our shovel mechanism on and from the tractor, we provide on each side a special frame 24, which straddles the traction unit 22, and is secured to a housing 25 supported on inner and outer longitudinal side members 26 of the traction unit in any convenient manner. Although thus shown, it is not essential to our invention that our shovel mechanism be supported in this particular manner.

At a low rear point on the tractor, such as point 27 on each special frame 24, there is pivoted an upwardly projecting link 28, which may be keyed to cross shaft 29 journalled on traction units 22, and supports pivotally at its upper end the rear end of one of push-arms 30.

The two push-arms 30 carry at their forward end a dumpable digging dipper 31, which may be of the sort shown and described in U. S. Patent Re. 22,662, for Tractor-Propelled Implement, reissued August 7, 1945, to George W. Mork. Its details form no part of our invention, and any other material-handling implement may be substituted.

At a relatively high forward point on the tractor, such as point 32 on each special frame 24, there is pivoted the elbow of a bell-crank 33. To one arm 33B of this bell-crank, as at 34, there is pivoted a cylinder-piston assembly 35 which is also pivotally supported by the tractor, as at point 36 on special frame 24.

The two cylinders are interconnected, as for example in the manner shown and described in U. S. Patent No. 2,321,615, for improvements in Bulldozers, issued June 15, 1943, to T. R. Paulsen. The primary purpose of this interconnection is merely to ensure simultaneous operation of the two assemblies, but there is another purpose which will be mentioned later herein.

The other arm 33A of the bell-crank 33 carries a sidewardly projecting pin 37, which engages a longitudinal slot 38 in push-arm 30. An alternative arrangement is shown in Figures 1A and 2A where pin 37' is carried by push-arm 30 and engages slot 38' in bellcrank arm 33A in which it is spring mounted for movement lengthwise of the bell-crank arm 33A.

Link 28 and push-arm 30 each carries one of cooperating stop members 39-40, which engage when the dipper 31 is lowered, thus causing link 28 and push-arm 30 to rotate as a unit about pivot 27, in the lower part of the cycle, and thus putting the digging reactions into the tractor solely at pivot 27, as in U. S. Patent No. 2,372,220, for improvements in Tractor-Propelled Implement, issued March 27, 1945, to George W. Mork. The interengagement of push-arm 30 and bell-crank arm 33A, through slot 38 and pin 37 (or slot 38' and pin 37') on these respective elements, permits this.

The respective paths of (a) the pivotal connection of link 28 and push-arm 30, (b) the pin 37, and (c) the center of gravity 41 of arms 30 plus loaded dipper 31, are shown by dashed curves on Figure 2, corresponding positions of these three moving points being indicated by corresponding numerals on their respective curves.

The above-described embodiment has the advantage of simplicity. The play of pin 37 in slot 38 (or pin 37' in slot 38') combined with the interconnection of the cylinder-piston assemblies permits considerable relative oscillation of the two traction units 22. The permitting of relative oscillation of the traction units, without twisting the frame formed by the push-arms and the dipper, will be referred to herein as "equalization." If additional equalization is required in any position, resort may be had to one of our other embodiments, now to be described.

Turning now to Figures 5, 6, 7 and 8, we see illustrated our second embodiment, which provides another method of equalizing for the relative oscillation of traction units 22.

Here special frame 24' is slightly different from special frame 24 of the first embodiment already discussed, and each pivot 32, which supports bell-crank 33, is in turn supported by one of the two uprights of a U-shaped member 42. The center of the U of this member 42 is in turn pivoted, at 43, on the center of cross-bolster 44, which in turn is slidably supported at 45 on each of the two traction units 22 in some such manner as is shown and described in U. S. Patent No. 2,063,035 for improvements in Endless Track Mounting, issued December 8, 1936, to F. A. Fuller et al.

The U-shaped member 42 is held against fore-and-aft pivoting by means of links 46, each of which is pivotally attached to special frame 24', as at 47, and to the U-shaped member 42, as at pivot 32.

The location of pivot 47 is important. In order to prevent distortion of the U due to relative motion of the links 46, due in turn to relative oscillation of the traction units 22, each pivot 47 should be located approximately on a line between rear axle 23 and the pivotal connection of link 46 to U 42.

Turning now to Figures 9 to 11, we see illustrated our third embodiment. Main frame 21 of a conventional tractor is supported by creeping traction units 22 which are independently oscillable about rear axle 23. A special frame 24 straddles each traction unit 22, being secured to housing 25 on inner and outer longitudinal side members 26 of the traction unit. Push arms 30 carry at their forward end a conventional dipper 31. Each push arm is supported by: (1) an upwardly projecting rear link 28, which is pivoted at a relatively low rearward point 27 on its corresponding frame 24, and is pivotally connected at its upper end 39A to the rear end of the push arm; and (2) one arm 33A of a bell-crank 33, which is pivoted at a relatively high forward point 32 on frame 24 and is pivotally connected to an intermediate point, such as to pin 48, fixed on the push arm. Each bell-crank 33 is actuated, to raise and lower its push arm 30, by a cylinder-piston assembly 35, the cylinder of which is pivotally supported by the tractor, as at 36 on frame 24, and the piston rod of which is pivotally connected, as at 34, to the other arm 33B of the bell-crank 33. The two cylinders (one on each frame 24) are interconnected (in a conventional manner fully shown and described in U. S. Patent No. 2,321,615) primarily to permit relative oscillation of the traction units 22. Pin 48 is fixed on each push-arm 30 and is normally (i. e. during raising and lowering of the dipper by operation of cylinder-piston assemblies 35) held fixed in slot 49 of arm 33A of bell-crank 33 by locking cylinder-piston assembly 50 which is pivotally attached at one end to arm 33B, as at 51, and at the other end to push arm 30, as at fixed pin 48. The cylinders of cylinder-piston assemblies 50 (one on each bell-crank) are interconnected (in the same conventional manner as cylinder-piston assemblies 35) to provide equalization of pressure. These cylinder-piston assemblies 50 are used to crowd the dipper 31 into the bank, when the dipper is in lowered position, as shown in broken lines in Figure 10, or to raise and lower the dipper along an approximately vertical path (parallel to the slot 49), when the dipper is in raised position, in order to dump or "spot" the load over a truck which is being loaded. Thus it is seen that the bell-crank arm 33A, together with its cylinder-piston assembly 50 and slot 49, functions as the mechanical equivalent of a link of length (distance between pivot points 32 and 48) that is normally (during normal raising and lowering of the dipper by cylinder-piston assemblies 35) fixed, but which can be varied (by operating cylinder-piston assemblies 50) to obtain special auxiliary motions of the dipper such as crowding (when dipper is in lowered position), or spotting (when dipper is in raised position).

In this third variant, steps 39—40 may be eliminated if desired.

Having now described and illustrated three alternative forms of our invention, we wish it to be understood that our invention is not to be limited to the specific forms or arrangements of parts herein described or shown.

In the claims, when we mention the term "tractor," we intend indiscriminately any part of the tractor as a whole, and intend the term to include any model, such as a toy, simulating a tractor. When we intend either the main tractor frame or the traction units we so specify.

Furthermore, when we refer in the claims to the "rear" of the tractor or the "rear" of an implement arm, we intend that end or portion thereof farthest from the implement. And when we refer in the claims to "clockwise" rotation of one of our links or bellcranks about its fixed pivot on the tractor, we mean a rotation that is clockwise when the pivot is viewed as in the figures; and when we refer in the claims to a "vertical" or "horizontal" orientation of some part on the tractor or some direction of motion, we mean a vertical or horizontal orientation when the tractor is in normal level position on the ground as shown in the figures.

It will be noted that, in some of the claims, we use the words "supported by," or some similar phrase. Such phrases are intended to cover indirect support, as well as direct support. However, inasmuch as one of the features of our invention is that the weight of all the parts of our implement, and of its load, are carried to the ground through the traction units without passing through the main tractor frame, we have narrowed some of our claims by reciting that the implement is "supported wholly by the traction units by means respectively oscillable with each of said traction units," or words to that effect; such language being intended merely to exclude support through the main tractor frame.

Furthermore when we claim a pivotal connection between two members, we do not intend to exclude a pivotal connection that allows relative translation as well as rotation of the members.

We claim:

1. In a material-handling implement for attachment to a tractor, the combination of: two implement arms, and the implement proper attached to the forward portion of the implement arms, each implement arm being supported and manipulated for raising and lowering the implement proper by the following described mechanism: a first member, adapted to be pivotally supported by the tractor near the rear thereof, and pivotally connected to the rear portion of the implement arm; a second member, adapted to be pivotally supported by the tractor at a point forwardly of and a fixed distance from the pivotal support of the first member, and pivotally connected to the implement arm at a point forwardly of the pivotal connection of the first member to the implement arm, said points being normally a fixed distance apart; and power-actuated means applied to the linkage formed by these two members and the implement arm to raise and lower the implement proper; said first and second members being oriented to rotate in a clockwise direction about their pivotal supports on the tractor as the implement proper is raised; and said first member being inclined upwardly and rearwardly from its pivotal support on the tractor, and said second member being oriented rearwardly from its pivotal support on the tractor, when the implement proper is in lowered position.

2. An implement according to claim 1, further characterized by the fact that the line between the pivots of the first member is approximately vertical and parallel to the line between the pivots of the second member when the implement proper is in raised position.

3. An implement according to claim 1, further characterized by the fact that the pivotal support of the second member on the tractor is substantially above the pivotal support of the first member.

4. An implement according to claim 1, further characterized by the fact that the second member is one arm of a bellcrank, and that the raising and lowering means is applied to the other arm of the bellcrank to rotate said bellcrank clockwise to raise the implement proper.

5. An implement according to claim 4, further characterized by the fact that the raising and lowering means is a cylinder-piston assembly pivotally supported on the tractor below the pivotal support of the bellcrank on the tractor and that said other arm of the bellcrank projects downwardly and forwardly from its pivotal support on the tractor when the implement proper is in lowered position and downwardly and rearwardly when the implement proper is in raised position, whereby said assembly is substantially horizontal throughout its operating cycle.

6. An implement according to claim 1, further characterized by the fact that at its pivotal connection to the second member, the implement arm is slidable relative to the second member for crowding movement in an approximately horizontal direction when the implement proper is lowered in a digging position.

7. An implement according to claim 6, further characterized by having a second power-actuated means operatively connected to the implement arms to vary the distance between said first and second points and thereby control said crowding movement of the implement arms.

8. An implement according to claim 7, further characterized by the fact that said second power-actuated means comprises a cylinder-piston assembly operatively connected between each implement arm and its second member, the assemblies being interconnected for common operation and equalization.

9. An implement according to claim 1, further characterized by the fact that the second member is one arm of a bellcrank, and that the raising and lowering means is applied to the other arm of the bellcrank to rotate said bellcrank clockwise to raise the implement proper; that the pivotal connection between the bellcrank and the implement arm comprises a slot in the bellcrank approximately lengthwise of the bellcrank arm, and a cooperating pin fixed on the implement arm; that there is on each side of the tractor in addition to the raising and lowering means a cylinder-piston assembly operatively connected to the implement arm to control movement of said pin in said slot; and that the cylinders of these two cylinder-piston assemblies are interconnected for common operation and for equalization.

10. In an implement for attachment to a tractor for the sort having a main frame, two traction units pivoted thereto, and support means oscillable with each of the traction units, the combination of: two implement arms and an implement proper attached to the forward portion of the implement arms, each implement arm being supported and manipulated for raising and lowering the implement proper by the following described mechanism: a member adapted to be pivotally supported by a traction unit independently of the main frame and near the rear thereof, and pivotally connected to the rear portion of the implement arm; a bellcrank with its elbow adapted to be pivotally supported by the support means at a point a fixed distance forwardly of and above the pivotal support of the member, and having two arms, the first bellcrank arm being pivotally connected to the implement arm at a point forwardly of the pivotal connection of the member to the implement arm and normally a fixed distance from the first-mentioned point; and power-actuated means applied to the second bellcrank arm to raise and lower the implement proper; said member and bellcrank being oriented to rotate in a clockwise direction about their pivotal supports as the implement proper is raised; and said member being inclined upwardly and rearwardly from its pivotal support on the tractor, and said second bellcrank arm being oriented rearwardly and approximately horizontally from its pivotal support on the tractor, when the implement proper is in lowered position.

11. An implement according to claim 10, further characterized by the fact that each member is adapted to be pivotally supported adjacent the pivot of its supporting traction unit to the main frame.

12. An implement according to claim 10, further characterized by the fact that the support means for the bell cranks includes a cross-bolster adapted to be supported by the front ends of the traction units, and a U-shaped member pivotally supported by the bolster and supporting the bellcranks on the respective uprights of the U.

13. An implement according to claim 12, further characterized by the fact that each upright of the U-shaped member is braced by a link that is pivotally connected to the upright of the U and to the corresponding traction unit, and is oriented so that the extended line between its pivots normally passes through the pivotal connection of said traction unit to the tractor main frame.

14. In a material-handling implement for attachment to a tractor, the combination of: an implement arm, and the implement proper attached to the forward portion of the implement arm, the implement arm being supported and manipulated for raising and lowering the implement proper by the following described mechanism: guide means adapted to be supported by the tractor near the rear thereof, and having a pivot connection to the rear portion of the implement arm, said guide means being oriented to permit said pivot to move forwardly approximately horizontally as the implement proper is raised; a member adapted to be pivotally supported by the tractor at a point forwardly of said guide means, and pivotally connected to the implement arm at a point forwardly of the pivot connection of the guide means to the implement arm, said points being normally a fixed distance apart, and said member being oriented to pivot clockwise about its support on the tractor as the implement proper is raised and to extend rearwardly and approximately horizontally from said pivot support when the implement proper is in lowered position; and power-actuated means applied to the linkage formed by the member and the implement arm to raise and lower the implement proper.

15. An implement according to claim 14, further characterized by the fact that the pivotal support of the member on the tractor is approximately at the same level plane as the guided path of the pivot of the rear portion of the implement arm.

16. An implement according to claim 14, further characterized by the fact that the member is one arm of a bellcrank, and that the raising and lowering means is applied to the other arm of the bellcrank to rotate said bellcrank clockwise to raise the implement proper.

17. In a material-handling implement for attachment to a tractor, the combination of: two implement arms, and the implement proper attached to the forward portion of the implement arms, each implement arm being supported and manipulated for raising and lowering the implement proper by the following described mechanism: a first member, adapted to be pivotally supported by the tractor near the rear thereof, and pivotally connected to the rear portion of the implement arm; a second member, adapted to be pivotally supported by the tractor at a point forwardly of and a fixed distance from the pivotal support of the first member, and pivotally connected to the implement arm at a point forwardly of the pivotal connection of the first member to the implement arm and a normally fixed distance from the first-mentioned point; and power-actuated means applied to the linkage formed by these two members and the implement arm to raise and lower the implement proper; said first and second members being oriented to rotate in a clockwise direction about their pivotal supports on the tractor as the implement proper is raised; the line between the pivots of the first member being approximately perpendicular to the line between the pivots of the second member when the implement proper is in lowered position; and said lines being approximately vertical and parallel to each other when the implement proper is in raised position.

18. An implement according to claim 17, further characterized by the fact that the pivotal support of the second member on the tractor is substantially above the pivotal support of the first member.

19. An implement according to claim 17, further characterized by the fact that the second member is one arm of a bellcrank, and that the raising and lowering means is applied to the other arm of the bellcrank to rotate said bellcrank clockwise to raise the implement proper.

20. An implement according to claim 17, further characterized by the fact that, at its pivotal connection to the second member, the implement arm is slidable relative to the second member for crowding movement in an approximately horizontal direction when the implement proper is lowered in a digging position.

SHERMAN HOAR.
JOHN A. THIERRY.

REFERENCES CITED

The following references are of record in the file of this patent:

UNITED STATES PATENTS

| Number | Name | Date |
|---|---|---|
| 548,925 | Pierce | Oct. 29, 1895 |
| 1,710,632 | Main et al. | Apr. 23, 1929 |
| 2,269,775 | Le Bleu | Jan. 13, 1942 |
| 2,303,379 | Mork | Dec. 1, 1942 |
| 2,310,284 | Gurries | Feb. 9, 1943 |
| 2,345,620 | Mork | April 4, 1944 |
| 2,367,784 | Knoizen et al. | Jan. 23, 1945 |
| 2,372,220 | Mork | Mar. 27, 1945 |
| 2,394,830 | Woodin | Feb. 12, 1946 |